United States Patent
Bova et al.

[11] Patent Number: 5,873,191
[45] Date of Patent: Feb. 23, 1999

[54] FISHING ROD HOLDER WITH AUTOMATIC HOOK SETTING MECHANISM

[76] Inventors: Anthony P. Bova, 4645 Balfour St., Las Vegas, Nev. 89121; Bruce E. Jacobson, 3400 15th St. W. #63, Rosamond, Calif. 93560

[21] Appl. No.: 722,780

[22] Filed: Sep. 27, 1996

[51] Int. Cl.⁶ .................................................. A01K 97/10
[52] U.S. Cl. ................................................................ 43/15
[58] Field of Search ........................................... 43/15, 16

[56] References Cited

U.S. PATENT DOCUMENTS

| | | | |
|---|---|---|---|
| 2,642,690 | 6/1953 | Soenksen | 43/15 |
| 2,744,351 | 5/1956 | Smith | 43/16 |
| 2,804,277 | 8/1957 | Kinder | 43/15 |
| 2,918,746 | 12/1959 | Hamrick | 43/15 |
| 3,407,527 | 10/1968 | Hill | 43/15 |
| 3,412,499 | 11/1968 | Pastrovich | 43/15 |
| 3,699,701 | 10/1972 | Jacobs | 43/15 |
| 3,837,109 | 9/1974 | DeJulio | 43/15 |
| 3,977,117 | 8/1976 | Zahner | 43/15 |
| 4,031,651 | 6/1977 | Titze | 43/15 |
| 4,159,589 | 7/1979 | Pendegraft | 43/15 |
| 4,215,503 | 8/1980 | Hiner | 43/15 |
| 4,235,035 | 11/1980 | Guthril | 43/15 |
| 4,471,553 | 9/1984 | Copeland | 43/15 |
| 4,676,018 | 6/1987 | Kumball | 43/15 |
| 4,730,408 | 3/1988 | Miller | 43/15 |
| 5,245,778 | 9/1993 | Gallegos | 43/15 |

FOREIGN PATENT DOCUMENTS

| 793626 | 4/1958 | United Kingdom | 43/15 |
|---|---|---|---|

*Primary Examiner*—Kurt Rowan
*Attorney, Agent, or Firm*—Lyon & Lyon LLP

[57] ABSTRACT

A device for holding a fishing rod and reel in a fishing mode and automatically raising the rod to set the fishhook in response to a fish pulling on the baited line. The device includes a lower support portion adapted to be anchored in the ground or in another fixed support, a body portion extending upwardly from the support portion, a rod carrying sleeve pivotally mounted on the body portion and movable between a forwardly inclined fishing position and a substantially upright disposition, a spring member for rapidly moving the sleeve from the fishing position to the substantially upright position, and a trip lever assembly for holding the sleeve in the fishing position against the force of the spring and releasing the sleeve in response to a pull on the line. The trip assembly includes a first lever about which a portion of the fishing line is disposed and a second lever which holds the sleeve in place. Pivotal movement of the first lever caused by a fish pulling on the line causes a pivotal movement of the second lever which releases the sleeve, allowing the spring member to snap the sleeve and rod to the upright position, setting the hook in the mouth of the fish.

7 Claims, 4 Drawing Sheets

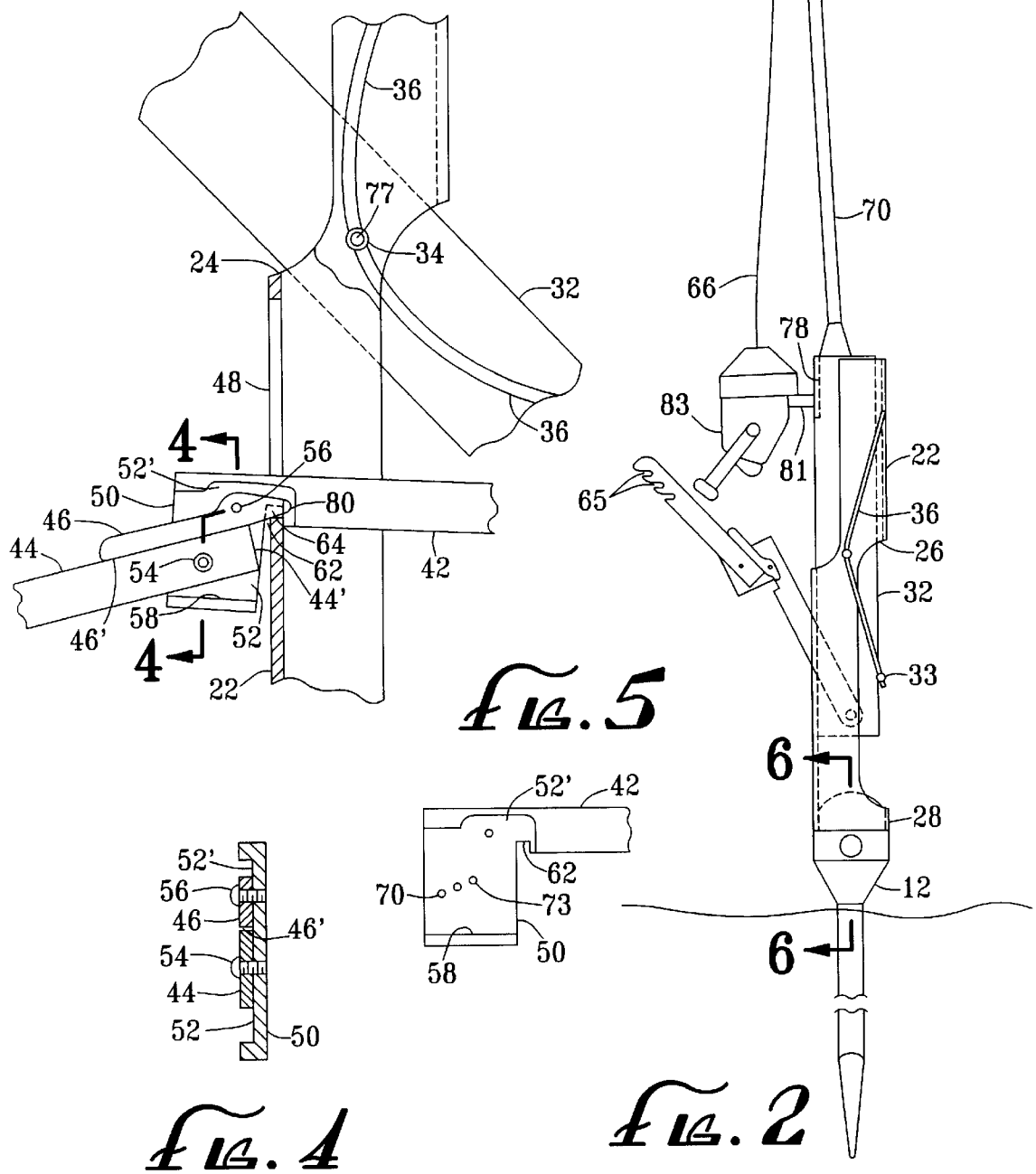

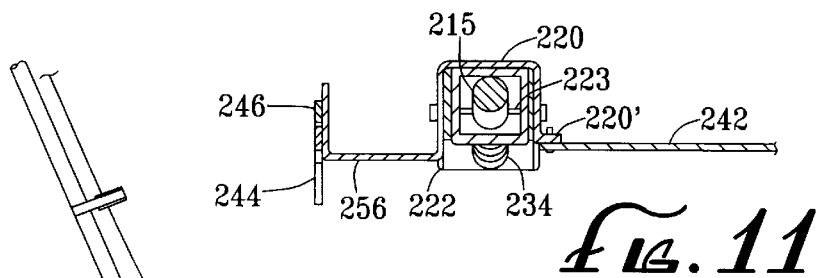
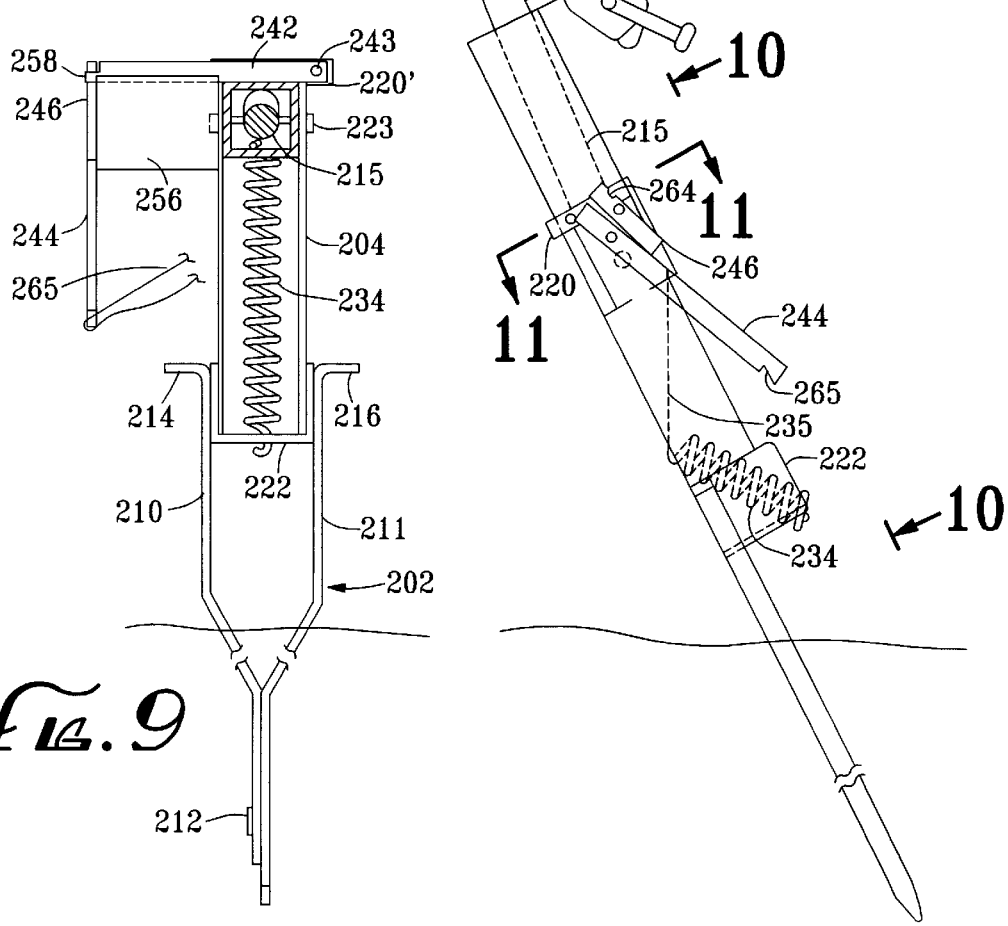

 …
FISHING ROD HOLDER WITH AUTOMATIC HOOK SETTING MECHANISM

BACKGROUND OF THE INVENTION

The sport of stationary bait fishing, whether it be from a boat or the waters' edge, has periods of tedium as well as excitement. There are often long periods of time between nibbles or strikes during which it would be desirable to be able to put down the rod and tend to another task. One is reluctant to do so, however, for fear that a fish will take the bait while the rod is unattended. If the rod were unsecured when a fish struck, both the rod and reel could be lost. Even if the rod were secured in a holding device, the chance of catching a fish with an unattended rod is greatly diminished. Unless the fish were to strike and swallow the bait, it is unlikely that the hook would be adequately set to land the fish. More likely, the bait would be taken and a catch lost. Fishing rods generally cannot be left unattended while fishing with any realistic expectation of catching a fish. As a result, many people loose interest in fishing during prolonged periods of inactivity. It would be highly desirable if a device could be developed which would allow one to leave his or her rod unattended for a period of time and, if a fish were to nibble at the bait, the device would automatically move the rod in a manner so as to set the hook and provide one with the opportunity to land the fish. Such a device would enable fishermen to attend to other tasks while fishing without having to reel in their line or risk loosing their bait or even their rod and reel if the rod were left unsecured. Such a device also would allow others to engage in diversionary activities while fishing and could open the sport to handicapped persons who might have difficulty in holding the rod relatively motionless for prolonged periods and/or in properly setting the hook upon feeling a bite or nibble. The present invention provides such a device.

SUMMARY OF THE INVENTION

The present invention relates to a spring actuated fishing rod holding device which securely holds a fishing rod and reel in a forwardly inclined fishing position and rapidly moves the rod upwardly and rearwardly to set the fishhook automatically in response to a fish pulling on the line. The rod holding device includes a pivotally mounted, spring biased sleeve for holding the handle of the fishing rod in an upright fishing position and a trip assembly operatively connected to the sleeve. Upon pivoting the sleeve to the inclined fishing position, a first lever arm in the trip assembly holds the sleeve in place against the force of the spring. Upon directing a portion of the fishing line projecting from the reel about a second lever arm in the assembly, a subsequent pulling on the line by a fish will cause the second arm to pivot and move the first arm and release the holding engagement of the sleeve, allowing the spring to snap the sleeve into a upright disposition. As the sleeve is rapidly pivoted to the upright position, the tip of the rod and line are caused to move upwardly and rearwardly, setting the hook in the fish's mouth without the need of assistance. To increase the mechanical advantage afforded by the trip assembly and thus the sensitivity of the device, a third lever arm is pivotally mounted between the first and second arms.

It is the principal object of the present invention to provide a device for securely holding a fishing rod and reel in an inclined fishing position which will rapidly move the tip of the rod upwardly and rearwardly in response to a fish pulling on the fishing line to effect a setting of the fish hook in the mouth of the fish.

It is another object of the present invention to provide such a device which is highly sensitive and thus responsive to light tugging on the line to decrease the chance of a fish taking the bait without triggering the trip assembly.

It is yet another object of the present invention to provide such a device which allows for adjustability in the sensitivity of the trip assembly for different situations.

It is a still further object of the present invention to provide such a device which is easy to operate and economical to manufacture.

These and other objects and advantages of the present invention will become readily apparent from the following detailed description taken in conjunction with the accompanying drawings.

BRIEF DESCRIPTION OF THE DRAWING

FIG. 2 is a side view of the fishing rod holder of the present invention showing the holder in the vertical sprung position.

FIG. 3 is a sectional view taken along the line 3—3 in FIG. 1.

FIG. 4 is a sectional view taken along the line 4—4 in FIG. 3.

FIG. 5 is a side view of a portion of the pivot arm of the trip assembly.

FIG. 8 is a side view of an alternate embodiment of the present invention showing the holder in the upright sprung position.

FIG. 9 is a sectional view taken along the line 9—9 in FIG. 7.

FIG. 11 is a sectional view taken along the line 11—11 in FIG. 8.

DESCRIPTION OF THE PREFERRED EMBODIMENTS

Figures 1, 6:
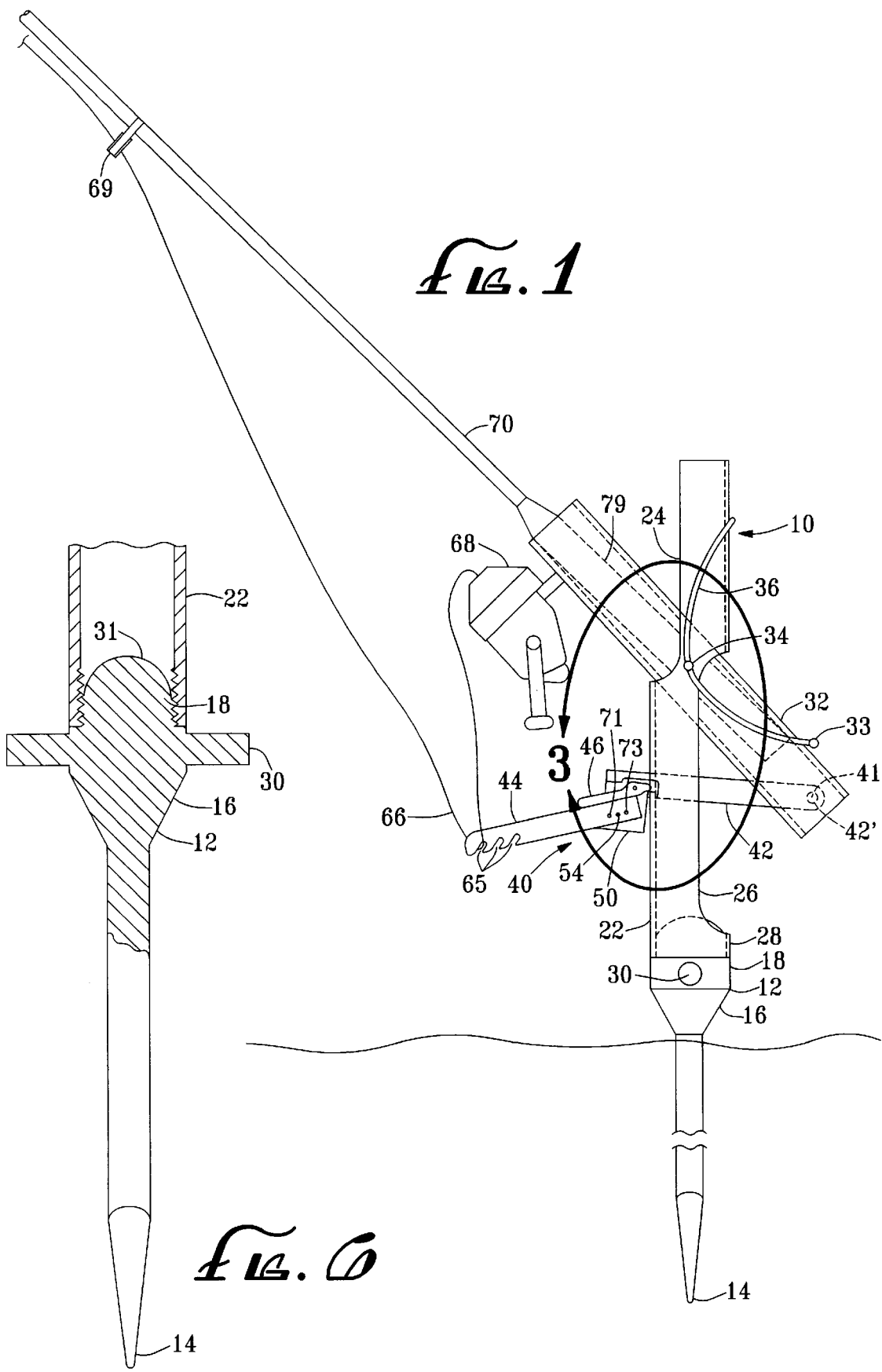
FIG. 1 is a side view of the preferred embodiment of the present invention showing the rod holder in the cocked fishing position.
FIG. 6 is a sectional view taken along line 6—6 in FIG. 2.
Figure 10:
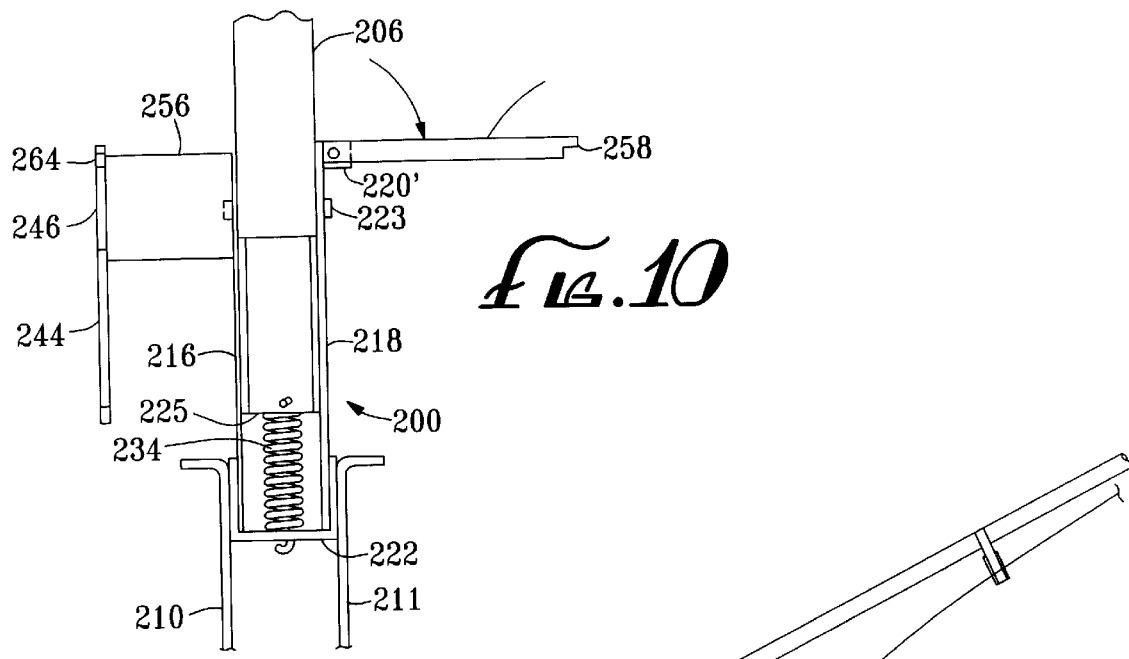
FIG. 10 is a partial front view of the trip assembly as seen from the line 10—10 in FIG. 8.

Referring now in detail to the drawings, the fishing rod holding device 10 of the present invention shown in FIGS. 1–6 comprises a lower support portion 12 having a pointed lower end 14 so as to define a stake adapted to be driven into the ground for securing the rod holding device 10 in place. Support portion 12 terminates at its upper end in a frustoconical member 16 having a externally threaded cylindrical portion 18 extending upwardly therefrom for threaded engagement with the body portion 22 of the rod holder. The body portion 22 of device 10 is of a cylindrical tubular configuration defining cut-out portions 24 and 26 in oppositely disposed upper and lower portions thereof and a lower annular portion 28 extending about the lower end of cut-out portion 26. Portion 28 is internally threaded for engagement with the cylindrical portion 18 at the upper end of support portion 12 to provide threaded securement between the support and body portions of the device. A cylindrical rod 30 is transversely mounted through the frustoconical member 16 so as to define a handle for effecting the threaded engagement of the support and body portions. The support portion 12 is also preferably provided with a contact surface 31 spaced above the threads in cylindrical portion 18 to avoid damaging the threads when the support portion 12 is driven into hard ground with a hammer or the like.

An elongated rod holding member defined by a tubular sleeve 32 is pivotally mounted at opposed sides within body portion 22 by means of oppositely disposed mounting pins 34 (only one being shown). So disposed, the sleeve 12 can pivot with respect to the stationary body portion 22 between a substantially vertical disposition and a forwardly inclined position by passing through cut-out portions 24 and 26 therein as seen in FIGS. 1 and 2. An elongated closed wire loop spring 36 is carried by pins 34 and abuts the rearward sides of body portion 22 proximate the upper end thereof and tubular sleeve 32 proximate the lower end thereof. Spring 36 is preferably formed of about 0.106 inch diameter steel wire and is held in its loop configuration by a metal sleeve 33. Sleeve 33 can be crimped about the ends of spring 36 or, alternatively, the ends of the spring can be extended into the tubular member through apertures drilled in the side thereof proximate the ends of the tubular member and a fastening member (not shown) threadably engages and projects into each end of member 33, bearing against the end portions of the spring member within member 33 to secure the spring in place.

A trip lever assembly 40 is pivotally mounted on a transversely disposed rod 41 extending across and secured within a lower end portion of sleeve 32. The trip lever mechanism 40 comprises a first arm 42 hereinafter referred to as a pivot arm, a second arm 44 hereinafter referred to as a trigger arm, and a third arm 46 hereinafter referred to as a trip arm. Pivot arm 42 is pivotally mounted proximate its inner end 42' on rod 41 and projects from sleeve 32 through an elongated slot 48 in the body portion 22 adjacent cut-out portion 24 as seen in FIGS. 1 and 3. Pivot arm 42 defines a depending substantially rectangular tab portion 50 at its extended end. As best seen in FIGS. 3–5, tab portion 50 has a channel 52 formed in one side thereof. An upper portion 52' of channel 52 projects upwardly into pivot arm 42 to accommodate a portion of the trip arm 46. Trigger arm 44 is pivotally mounted in a lower portion of channel 52 by a suitable fastening member 54. Trip arm 46 is similarly pivotally mounted in an upper portion of channel 52 adjacent portion 52' thereof by means of fastening member 56. So disposed, pivotal counterclockwise movement of the trigger arm 44 (as seen in FIG. 3) is limited by the lower channel wall 58 in tab portion 50 of pivot arm 42 and clockwise movement of arm 44 is limited by the underside 46' of the trip arm 46. Alternatively, a cover plate (not shown) could be secured to tab portion 50 of pivot arm 42 so as to cover channel 52. The cover could carry inwardly directed pivot pins to effect the pivotal mounting of trigger arm 44 and trip arm 46 in lieu of fastening members 54 and 56.

An upwardly extending notch 62 is defined in pivot arm 42 adjacent depending tab portion 50. Notch 62 is adapted to receive the lower end wall portion 64 of slot 48 as seen in FIG. 3 and thereby hold the sleeve 32 in a cocked position (see FIGS. 1 and 3) against the force of loop spring 36. From this cocked position, a clockwise rotation of pivot arm 42 would cause a disengagement of the pivot arm 42 with wall portion 64 of sleeve 32 and allow the loop spring to rapidly pivot the sleeve 32 from the fishing position illustrated in FIG. 1 to the substantially upright or vertical position illustrated in FIG. 2. As will be described, the movement is effected by clockwise rotation of the trip arm 46 which results from an upward force being exerted on the extended end 44' of the trigger arm 44.

A plurality of line notches 65 are provided in the extended end portion 44' of the trigger arm 44 in a slightly rearwardly inclined disposition for receiving therein a portion of the fishing line 66 disposed between the reel 68 and first eyelet 69 on the rod 70 as illustrated in FIG. 1. Thus, a pulling on the end of the line by a fish would pull the trigger arm 44 upwardly against the trip arm 46. The inclusion of multiple notches 65 in the trigger arm 44 provides a means of varying the sensitivity of the trip lever assembly 40. The greater the spacing between the notch through which the line is disposed and the fastening member 56, the less the force need to activate the trip assembly. To provide additional adjustment in the force needed to actuate trip assembly, additional apertures 71 and 73 can be provided proximate the inner end 44" of trigger arm 44 and/or in the depending tab portion 50 of pivot arm 42 as illustrated in FIG. 5. By moving the pivot point (location of fastening member 56) outwardly toward the line carrying notches 65, the sensitivity of assembly is decreased. Moving pivot member 56 inwardly toward body member 22 increases the effective length of the movement arm defined by trigger arm 44 and thus the sensitivity of the trigger arm assembly 40.

The loop spring 36 is held in place by mounting pins 34 which extend through aligned apertures in oppositely disposed sides of the holder body 22 and sleeve 32. Each pin has a transversely disposed aperture (not seen) in the head portion thereof through which oppositely disposed portions of the spring 36 extend as seen, for example, in FIG. 3. To prevent any axial movement of the spring relative to the mounting pins 34, screws 77 are threadably extended through the ends of the pins so as to bear against the portions of the spring therein. The mounting pins themselves are held in position relative to the body 22 and sleeve 32 by means of the portions of the loop spring 36 passing therethrough adjacent opposite sides of sleeve 32 and by providing the pins with enlarged head portions (not shown) interiorly of the sleeve 32. A open ended channel 78 is formed in the upper end of sleeve 32 in axial alignment with trigger arm 44 to accommodate the mounting bracket 81 on the fishing reel 83 and thereby allow the fishing rod handle 79 to be inserted sufficiently into sleeve 32 so as to secure the rod 70 within the sleeve 32 and additionally locate the fishing reel 83 in close proximity to the trigger arm 44. Such a mounting allows the fishing line to pass from the reel, about one of the notches 65 in the trigger arm 44 and toward the first eyelet in the pole such that a pulling on the line will generate an upward force on the trigger arm 44 which is substantially normal to the longitudinal axis of the trigger arm to enhance the efficiency of the trip lever mechanism 40.

In use, the holding device 10 is first secured in a stationary support. With the embodiment of the invention illustrated in FIGS. 1–6, the lower support portion 12 of the device is threadably disengaged from the body portion 22 and driven into the ground so as to firmly secure the support portion in place. The body portion 22 is then threadably reattached to the support portion and the holding device is cocked. The cocking of holding device 10 is achieved by holding the support portion 12 and pulling forwardly on the upper end of the tubular sleeve 32 so as to pivot the sleeve counterclockwise relative to the body portion 22 (as seen from the perspective of the drawings) until the lower end wall 64 of slot 48 in the body portion 22 is received within the notch 62 in the pivot arm 42, as illustrated in FIGS. 1 and 3. In this position, the loop spring 36 is bent rearwardly against the backsides of the upper half of the body portion 22 and the lower half of the sleeve 32. The engagement of the pivot arm 42 with the body portion 22 holds the sleeve in place in the cocked position. In the cocked position, the sleeve is disposed at a forwardly inclined disposition with respect to the body and support portions of the holding device. Accordingly, when the rod handle 79 is inserted into sleeve 32, the rod will be at substantially the same inclination which is ideal for fishing. The portion of the line between the reel and the first eyelet 69 in the rod 70 is then simply looped about the trigger arm 44 through one of the notches 65 therein and pulled taut.

During use if a fish tugs at the bait so as to exert a force on the line of only about four ounces, a corresponding force is exerted upwardly on the trigger arm 44, causing the trigger arm to pivot about pivot pin 56. As the trigger arm 44 pivots in a clockwise direction about pin 56, the upper surface of the arm 44, which is disposed adjacent the underside 46' of the trip arm 46, causes a corresponding pivotal clockwise movement of the trip arm 46 about pivot pin 56. The underside 46' of trip arm 46 is preferably slightly convexly curved to provide a smoother operation of the trip assembly. As the trip arm 46 is pivoted clockwise, the inner end portion 80 thereof is caused to press downwardly on the top of the lower wall of slot 48 in the body portion 22 of the holding device adjacent the portion 64 of the wall which disposed within the notch 62 in the pivot arm 42. Accordingly, the clockwise rotation of the trip arm 46 will cause the pivot arm 42 to pivot upwardly in a clockwise direction about rod 41 disengaging wall portion 64 from notch 62 and allowing the flexed loop spring 36 to rapidly return the tubular sleeve 32 to an upright disposition within the body portion 22. When this occurs, the fishing rod held within sleeve 22 is correspondingly moved upwardly and rearwardly, effecting a setting of the hook in the mouth of a fish pulling at the bait on the line.

With the above described design, the rod holding device 10 will trigger with a pull of about four ounces on the line. It is important to maximize the sensitivity of the device so that a fish cannot nibble at the bait and "steal" the bait without the device being activated. However, it in certain instances, it may be desired to increase the force necessary to trigger the device as, for example, when fishing in a river with relatively strong current. To provide this adjustability, a number of spaced notches 62 were formed in the extended end of the trigger arm 44 and additional apertures 71 and 73 were formed in the inner end portion of the trigger arm 44 and the tab portion 50 of pivot arm 42 to provide multiple locations for the positioning of the pivot pin 54. With the above-described loop spring 36, the center hole mounting of pin 54 in combination with looping the line about the outermost notch 65 in trigger arm 44 as illustrated in FIG. 1 will provide the aforesaid triggering force of four ounces.

In the above-described preferred embodiment of the invention, the various components of the device 10 are preferably constructed of anodized aluminum, except for the loop spring 36 which is comprised of 0.10 inch diameter steel wire. The embodiment of the lower support potion 12 of the rod holding device 10 defines a stake for mounting device 10 in the hard ground. If the device were to be used in sand, the stake portion would preferably be provided with a broad flat surface (not shown) adapted to be aligned parallel to the water's edge to inhibit a forward tilting of the holding device 10 upon the bait being taken by a fish. Alternatively, the lower support portion could be configured to be received in a variety of differently configured fixed anchor supports. Such supports typically would be used on boats and docks when a stake configuration is not appropriate.

An alternate embodiment of the rod holding device 200 is illustrated in FIGS. 7–11. The alternate embodiment comprises a lower stake support portion 202, a body portion 204, a sleeve portion 206 and a trip lever mechanism 208. As with the prior embodiment, the support portion 202 of the holding device 200 could be of any desired configuration for securement with a fixed anchor support as well as the ground. In the alternate embodiment shown in the drawings, the support portion 202 is comprised of two rod members 210 and 211 bent inwardly and joined together proximate their lower ends by one or more rivet members 212 or other suitable fastening means. The upper ends of the rod members 210 and 211 are flared outwardly so as to define flanges 214 and 216 for use in inserting the support portion 202 into the ground. The body portion 204 of holding device 200 comprises a pair of spaced parallel plates 216 and 218 joined at their upper ends by a horizontally disposed U-shape bracket 220 and at their lower ends by a vertically disposed U-shaped bracket 222. The upper end portions of rod members 210 and 211, the U-shaped bracket 222 and the lower end portions of plates are welded together or secured in place by suitable fastening members extending transversely therethrough.

Sleeve 206 which is adapted to hold the fishing rod handle 215 therein is pivotally mounted on plates 216 and 218 of body portion 204 proximate the upper end of the body portion by means of a suitable fastening member 223. An elongated coil spring 234 extends between the lower rearward end portion 225 of sleeve 206 and the forwardly disposed end of bracket 222. To prevent the lower forward end portion of sleeve 206 from interfering from the operation of spring 234, a forward lower end portion of sleeve 206 has been cut away so as to define an inclined forward end wall 235 circumscribing the lower end of the sleeve 206. While sleeve 206 has been shown to be square in cross section, a cylindrical tubular configuration could also be employed as in the in the prior embodiment.

Figure 7:
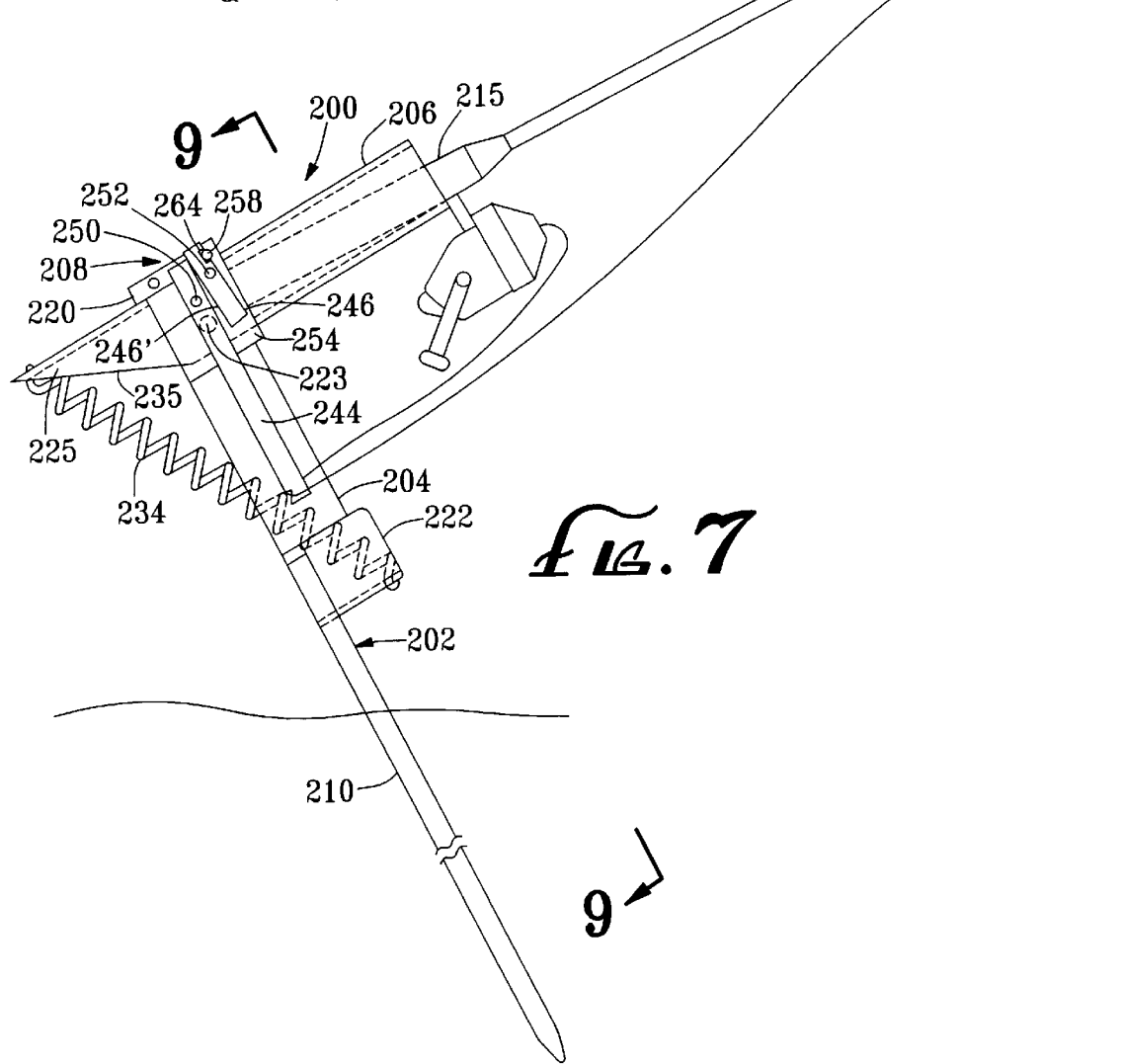
FIG. 7 is a side view of an alternate embodiment of the present invention showing the device in the cocked fishing position.

The trip lever mechanism 208 comprises a pivot arm 242, trigger arm 244 and trip arm 246. The pivot arm 242 is pivotally mounted at 243 on a flange 220' defined by an extended end portion of the bracket 220 on the body portion 204 of the holding device 200. The trigger arm 244 and trip arm 246 are pivotally mounted at 250 and 252 respectively on a rearwardly facing arm 254 of a U-shape bracket 256 mounted on plate 216 on body portion 204. Trigger arm 244 defines one or more line carrying notches 265 therein proximate the extended end thereof. Trip arm 246 defines a notch 264 proximate the upper end thereof for receiving a projection 258 extending from the end of pivot arm 242 when the trip mechanism 208 is in the cocked position as illustrated in FIGS. 7 and 9.

In the cocked position, the sleeve 206 is pivoted forwardly about member 223, extending spring 234 between the rearward end of the sleeve and the lower U-shaped bracket 222 on the body portion of the device. The pivot arm 242 is pivoted across the upper end of the sleeve portion 206 such that it abuts the upper surface thereof, holding the sleeve in its forwardly extending position against the tension of spring 234. Pivot arm 242 extends from the upper surface of the sleeve behind an upper portion of bracket 256 where it is received in the notch 267 in the trip arm 246. In this cocked position, a tugging on the fishing line will cause the trigger arm 244 to pivot in a counterclockwise direction (as seen from FIG. 7) against the lower portion of the rearward surface 246' of trip arm 246, causing the trip arm also to pivot in a counterclockwise direction. As the trip arm moves counterclockwise, the projection 258 on the pivot arm 242 is released from the notch 264 in the upper end portion of the trip arm 246, whereupon the sleeve snaps to an upright position as illustrated in FIG. 8. Surface 246', like surface 46' on the prior embodiment of the invention, is preferably slightly convexly curved for smoother operation.

Various changes and modifications may be made in carrying out the present invention without departing from the spirit and scope thereof. Insofar as these changes and modifications are within the purview of the appended claims, they are to be considered as part of the present invention.

We claim:

1. An automatic hook setting device for holding a fishing rod in a forwardly inclined fishing position and rapidly moving the rod to a substantially vertical position in response to a fish pulling on the fishing line, said device comprising: a lower supporting portion adapted to be secured in a fixed disposition; a body portion carried by said supporting portion and extending upwardly therefrom; an elongated rod holding member pivotally mounted on said body portion and movable between said inclined fishing position and said substantially vertical position; a spring member operatively connected to said body portion such that upon said rod holding member being moved to said inclined fishing position, said spring member is in a flexed disposition urging said rod holding member to said substantially vertical position; and a trip lever assembly including a first arm pivotally mounted on said rod holding member and engaging said body portion to hold said rod holding member in said inclined fishing position, a second arm pivotally mounted on said first arm and defining therein at least one line receiving notch spaced from said first arm, said notch being adapted to have a portion of the fishing line extended therethrough such that upon pulling on said line, said line causes said second arm to undergo pivotal movement, and a third arm pivotally mounted on said first arm adjacent said second arm such that said pivotal movement of said second arm causes said second arm to abut and pivot said third arm, said third arm effecting pivotal movement of said first arm to release said body member whereupon said spring member rapidly pivots said rod holding member to the substantially vertical position, and wherein said third arm defines a curvilinear bottom surface, said second arm abutting and moving along said bottom surface upon said second arm being moved by said line.

2. An automatic hook setting device for holding a fishing rod in a forwardly inclined fishing position and rapidly raising the rod to a substantially vertical position in response to a fish pulling on the fishing line, said device comprising: a lower supporting portion adapted to be secured in a fixed disposition; an elongated tubular member carried by said supporting portion and extending upwardly therefrom, said tubular member having an open upper forwardly disposed portion and an open lower rearwardly disposed portion; a hollow sleeve for holding the fishing rod, said sleeve being pivotally mounted on said tubular member such that said sleeve is pivotally movable within said member from a substantially vertical position in axial alignment with said member to said inclined fishing position; a spring member operatively connected to said tubular member for biasing said hollow sleeve to said substantially vertical position; and a trip lever assembly including a first pivotally mounted arm for holding said sleeve in said inclined fishing position upon said sleeve being moved to said inclined fishing position and a second arm adapted to have the fishing line extended about a portion thereof and being operatively connected to said first arm such that upon a fish pulling on said line, said line causes said second arm to pivot and move said first arm so as to release said sleeve, whereupon said spring member rapidly pivots said sleeve to the substantially vertical position.

3. The automatic hook setting device of claim 2 wherein said spring member defines an elongated closed loop spring mounted on said tubular member such that upon said tubular member being moved to said inclined fishing position, said spring member bears against a lower rearward portion of said sleeve and an upper rearward portion of said tubular member in a flexed disposition so as to rapidly pivot said sleeve to the substantially vertical position upon the release of said sleeve by said first arm.

4. An automatic hook setting device for holding a fishing rod in a forwardly inclined fishing position and rapidly rising the rod to a substantially vertical position in response to a fish pulling on the fishing line, said device comprising: a lower supporting portion adapted to be secured in a fixed disposition; a body portion carried by said supporting portion and extending upwardly therefrom; an elongated rod holding member pivotally mounted on said body portion and movable between said inclined fishing position and said substantially vertical position; a spring member operatively connected to said body portion and bearing against said body portion and said rod holding member for biasing said rod holding member to said substantially vertical position; and a trip lever assembly including a first arm pivotally mounted on said rod holding member and projecting forwardly therefrom for engaging said rod holding member and holding said rod holding member in said inclined fishing position upon said rod holding member being moved to said inclined fishing position and a second arm pivotally mounted on said first arm and projecting forwardly therefrom, said second arm defining at least one line receiving notch in an underside portion thereof adapted to have the fishing line extended therethrough such that upon a fish pulling on said line, the line causes said second arm to undergo pivotal movement, and a third arm disposed adjacent said second arm such that the pivotal movement of said second arm causes said second arm to abut and pivot said third arm, said third arm effecting pivotal movement of said first arm to release said rod holding member whereupon said spring member rapidly pivots said rod holding member to the substantially vertical position, and wherein said third arm defines a curvilinear bottom surface, said second arm abutting and moving along said curvilinear surface as said second arm is caused to pivot by the fishing line.

5. An automatic hook setting device for holding a fishing rod in a forwardly inclined position and rapidly moving the rod to a substantially vertical position in response to a fish pulling on the fishing line, said device comprising: a lower supporting portion adapted to be secured in a fixed disposition; an elongated tubular member having an open upper forwardly disposed portion and an open lower rearwardly disposed portion and being carried by said supporting portion and extending upwardly therefrom; a hollow sleeve for holding said fishing rod, said sleeve being pivotally mounted within said tubular member and movable between an inclined fishing position and said substantially vertical position in axial alignment with said tubular member; a spring member operatively connected to said tubular member such that upon said sleeve being moved to said inclined fishing position, said spring member is in a flexed disposition urging said sleeve to said substantially vertical position; and a trip lever assembly including a first arm for holding said sleeve in said inclined fishing position upon said sleeve being moved to said inclined fishing position, a second arm pivotally mounted on an extended end portion of said first arm and adapted to have a portion of the fishing line extended thereabout, and a third arm pivotally mounted on said portion of said first arm substantially adjacent said second arm such that a pulling on said line causes said second arm to pivot about said third arm, causing said third arm to pivot on said first arm and move said first arm so as to release said sleeve, whereupon said spring member rapidly pivots said rod holding member to the substantially vertical position.

6. The automatic hook setting device of claim 5 wherein said third arm defines a curvilinear bottom surface, said second arm abutting and moving along said curvilinear surface as said second arm is caused to pivot by the fishing line.

7. The automatic hook setting device of claim 5 wherein said spring member defines an elongated closed loop spring mounted on said tubular member such that upon said body member being to said inclined fishing position, said spring member bears against a lower rearward portion of said sleeve and an upper rearward portion of said tubular member in a flexed disposition so as to rapidly pivot said sleeve to the substantially vertical position upon the release of said sleeve by said first arm.

* * * * *